Patented Nov. 30, 1937

2,100,532

UNITED STATES PATENT OFFICE 2,100,532

FLUORO COMPOUNDS OF ANTHRAQUINONE-2,1-BENZACRIDONE

Alexander J. Wuertz, Carrollville, and William Dettwyler, Milwaukee, Wis., assignors to E. I. du Pont de Nemours & Company, Wilmington, Del., a corporation of Delaware No Drawing. Application March 16, 1935, Serial No. 11,418

4 Claims. (Cl. 260—37)

This invention relates to the preparation of new anthraquinone-2,1-benzacridones containing fluorine in the benz ring, which are suitable for use as dyestuffs and also as valuable intermediates for the preparation of other dyestuffs.

According to our invention, these new fluoro derivatives of anthraquinone-2,1-benzacridone are prepared by condensing a fluoro-aniline compound with 1-chloro-anthraquinone-2-carboxylic acid in the manner normally used for the preparation of acridones. These compounds are then ring-closed to the acridones by the usual methods such as by treating with benzoyl chloride, benzotrichloride, thionyl chloride, acetyl chloride, phosphorus pentachloride, etc.

The following examples are given to more fully illustrate our invention. Parts used are by weight.

Example 1

50 parts of soda ash are dissolved in 500 parts of water and 50 parts of 1-chloro-anthraquinone-2-carboxylic acid are added. When all the acid is in solution, 100 parts of soda ash, 23 parts of para-fluoro-aniline and 3 parts of copper sulfate are added. The mass is then heated under reflux (102° C.) for 6 hours. The mass gradually changes from yellow to a red violet color. It is cooled to room temperature, filtered, and sucked dry. The cake is then suspended in dilute hydrochloric acid and filtered and washed acid free and dried.

The condensation product is a red powder, slightly soluble in alkali with a red violet color, soluble in concentrated sulfuric acid with a green yellow color.

For the formation of the acridone, 25 parts of the condensation product are suspended in 125 parts of nitrobenzene and 15 parts of benzoyl chloride are added. The mass is heated to reflux temperature and held ½ hour, cooled, filtered and washed. The Bz-para-fluoro-anthraquinone-2,1-benzacridone crystallizes in bright red needles. It is soluble in concentrated sulfuric acid with a yellow brown color and dyes cotton pink from a violet vat.

Example 2

50 parts of 1-chloro-anthraquinone-2-carboxylic acid are condensed as above described with 35 parts of meta-amino-benzotrifluoride.

The resulting product has most probably the following formula:

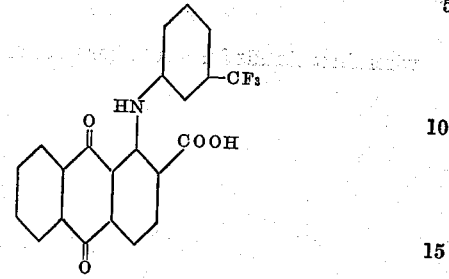

On ring-closure with benzoyl chloride in nitrobenzene, a Bz-meta-trifluoromethyl-anthraquinone-2,1-benzacridone is obtained.

The product consists of red crystals soluble in concentrated sulfuric acid with a yellow brown color and dyes cotton in pink shades from a violet vat.

In place of the para-fluoro-aniline used in Example 1, the isomeric fluoro-anilines, namely, the ortho- or para- compounds may be used in the same manner, also the various isomeric difluoro-aniline compounds. In place of the meta-amino-benzotrifluoride used in Example 2, the corresponding ortho- and para-amino-benzotrifluoride may be used.

As mentioned above, the condensation of the 1-chloro-anthraquinone-2-carboxylic acid and the fluoro-aniline compounds, as well as the ring-closure of the condensation products, may be carried out by any of the processes described in the prior art for the preparation of anthraquinone-benzacridones.

The fluoro compounds of our invention, when used as dyestuffs, give bluer shades than the corresponding chloro compounds. The fluorine in the benzene ring of the anthraquinone-benzacridone is very stable and is not replaceable by other groups in the same manner as the chloro compounds may be replaced, thereby making possible the use of these new compounds for the preparation of new dyestuffs.

What we claim is:

1. Compounds having the following general formula

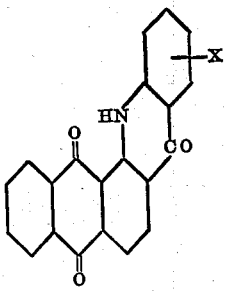

wherein X stands for substituents of the class consisting of $F_n$ and $CF_3$ wherein $n$ stands for a number not greater than 2.

2. Compounds having the following general formula

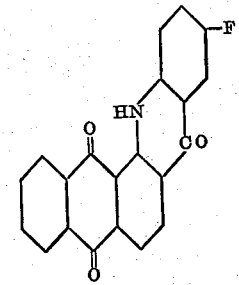

wherein $n$ stands for a number not greater than 2.

3. Compounds having the following general formula

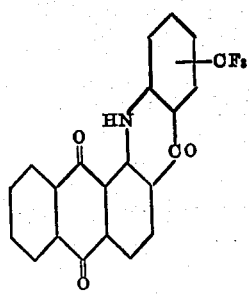

4. The compound having the following general formula

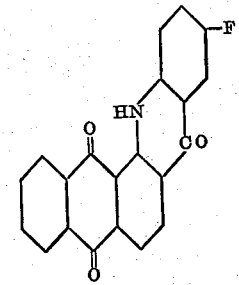

ALEXANDER J. WUERTZ.
WILLIAM DETTWYLER.